E. N. KIGER.
GATE AND GATE FASTENING.
APPLICATION FILED AUG. 7, 1916.
1,256,805.
Patented Feb. 19, 1918.
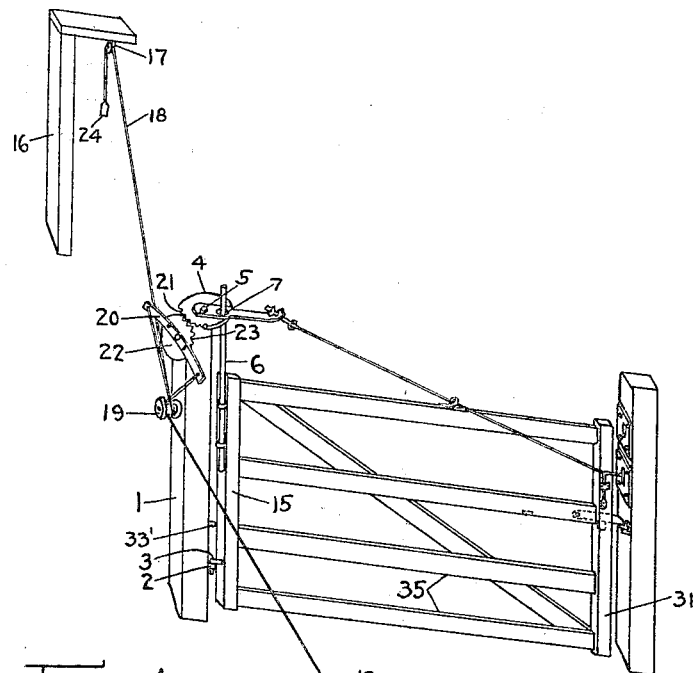
Fig-1-
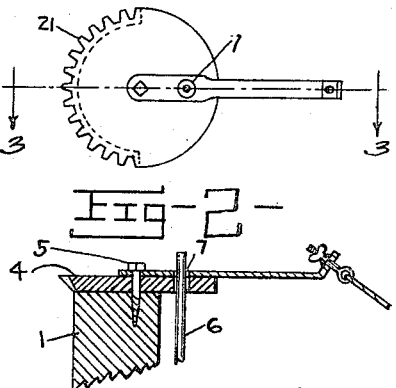
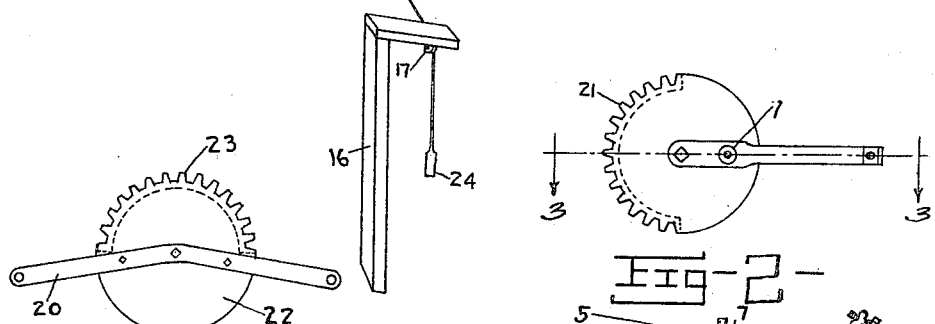
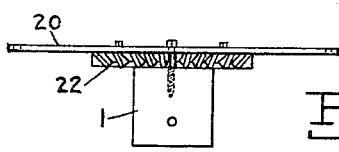
Inventor
Edrick N. Kiger
By Harry W. Rhodes
Attorney

UNITED STATES PATENT OFFICE.

EDRICK N. KIGER, OF PLUMMER, IDAHO.

GATE AND GATE-FASTENING.

1,256,805.          Specification of Letters Patent.     Patented Feb. 19, 1918.

Application filed August 7, 1916. Serial No. 113,517.

*To all whom it may concern:*

Be it known that I, EDRICK N. KIGER, a citizen of the United States, residing at Plummer, in the county of Benewah and State of Idaho, have invented certain new and useful Improvements in Gates and Gate-Fastenings, of which the following is a specification.

This invention relates to improvements in gates and gate fastenings and has particular reference to a distantly controlled swinging farm gate.

An important object of the invention is to provide means for positively swinging in either direction, farm road gates from distant points independent of gravity action, thus enabling such a gate to be operated on a side hill.

A further object of the invention is to provide standard fittings which will convert any ordinary farm gate into a remotely operated gate.

Other objects and advantages of the invention will be apparent during the course of the following description.

In the accompanying drawings forming a part of this specification and in which like numerals are employed to designate like parts throughout the same, Figure 1 is a perspective view of the gate, and control posts and ropes embodying my invention.

Fig. 2 is a plan view of the upper pivot supporting member of the gate.

Fig. 3 is a section view through the center of this upper support and of the gate-supporting post on the line 3—3 of Fig. 2.

Fig. 4 is a detail elevation of the member which engages the upper pivotal supporting piece.

Fig. 5 is a plan view of this engaging member, showing the top of the post 1 with the supporting plate removed.

In the drawings, wherein for the purpose of illustration is shown a preferred embodiment of my invention, numeral 1 designates a vertical post to which a gate is pivotally supported.

Numeral 2 is an eye or loop piece rigidly fastened to the post 1.

Numeral 3 is a pintle piece rigidly fastened to the gate, and having its projecting portion engaged with the eye 2, permitting free swinging motion of the gate to either side but being loose enough to permit a tilting of the gate to right or left, or to forward or rearward to a limited degree.

The gate is further held in position by the upper support 4 which is centrally and rotatably fastened at 5 to the post 1, through which piece the extension 6 passes eccentrically at 7. The piece 4 has its rearward half cut or notched with beveled teeth 21.

Numeral 6 is a rod rigidly mounted to the pivot post 15 and extending above the gate any desired distance before reaching the supporting piece 4.

Numerals 16 represent posts to be placed at any desirable points to support the pulleys 17 and controlling ropes 18. A spool or drum pulley 19 guides the ropes 18 and permits their motion to be transferred to the lever arm 20.

The arm 20 is rigidly mounted to a disk or plate 22 which is centrally and rotatably mounted in a vertical position on the rear of the post 1.

Disk 22 has its entire upper edge notched or cut into beveled teeth 23 which engage the teeth 21 of the piece 4.

When it is desired to open the gate, one of the handles 24 is pulled down. This in turn pulls down the corresponding end of the arm 20 and by means of the beveled teeth rotates the supporting piece 4. This then moves the extension rod 6 to one side or the other and slightly to the rear as the point of the gate supported by the pintle 2 is practically stationary. The movement of the upper pivot support causes the gate to tilt in one direction or the other and at the same time to tilt to the rear.

Existing remotely operated gates of somewhat similar design to this, depend upon the gravity action through the tilting of the hinge or pivotal post to swing the gate open. The gate shown here will open independent of any gravity action, will swing up hill or against considerable encumbrance such as weeds, etc.

The eye bolt 33' is exactly similar to the eye bolt 2, and is placed any desirable distance directly above the latter eye bolt. In case of snow the gate is merely lifted up and the pintle 3 inserted in eye bolt 33', and the gate is ready for exactly similar operation at a higher level.

The gate 35 is a common type of gate and any usual form of farm gate may readily be equipped with the fittings, as shown.

In the operation of this gate the driver wishing to pass through, pulls the nearest handle 24 as he approaches. The gate then opens away from him and he drives on through, and then in passing the far post 16 he grabs and pulls its handle 24 and the gate closes behind him.

It is understood that the form of my invention herewith shown and described is to be taken as a preferred example of the same, and that various changes in the shape, size and arrangement of parts may be resorted to without departing from the spirit of the invention or the scope of the sub-joined claim.

Having thus described my invention, I claim:

A gate operating mechanism comprising, in combination, a post, a gate hinged thereto adjacent its lower end, for opening and closing movement in two directions with respect to the post, a rotatable toothed support carried by the upper end of the post, a rod carried by the gate and extending through the support eccentrically to its center of rotation, a rotatable toothed plate carried by the post and arranged with its teeth in mesh with the teeth of the support, an arm fixed to said plate and extending laterally from either side thereof, a drum carried by the post, controlling elements passing over said drum and connected to the arm, said drum being arranged in vertical alinement with and spaced from the center of rotation of the plate, and means for supporting the controlling elements in operative positions at points remote from the gate.

In testimony whereof, I affix my signature in the presence of two witnesses.

EDRICK N. KIGER.

Witnesses:
ROY LINDLEY,
LEE FARISH.

Copies of this patent may be obtained for five cents each, by addressing the "Commissioner of Patents, Washington, D. C."